(12) United States Patent
Siomina et al.

(10) Patent No.: US 9,151,825 B2
(45) Date of Patent: Oct. 6, 2015

(54) ENHANCEMENT OF POSITIONING QUALITY OF SERVICE

(75) Inventors: Iana Siomina, Solna (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 764 days.

(21) Appl. No.: 13/122,693

(22) PCT Filed: Jul. 13, 2010

(86) PCT No.: PCT/SE2010/050834
§ 371 (c)(1),
(2), (4) Date: Aug. 16, 2011

(87) PCT Pub. No.: WO2011/126419
PCT Pub. Date: Oct. 13, 2011

(65) Prior Publication Data
US 2011/0294518 A1 Dec. 1, 2011

Related U.S. Application Data

(60) Provisional application No. 61/321,715, filed on Apr. 7, 2010.

(51) Int. Cl.
 H04W 24/00 (2009.01)
 G01S 5/02 (2010.01)
 H04W 64/00 (2009.01)
(52) U.S. Cl.
 CPC ............ *G01S 5/0263* (2013.01); *H04W 64/00* (2013.01)
(58) Field of Classification Search
 CPC ....... H04W 4/02; H04W 24/02; H04W 28/24; H04W 64/003; H04W 76/007; H04W 72/087
 USPC ............. 455/404.2, 456.1, 456.2, 456.3, 457
 See application file for complete search history.

(56) References Cited

U.S. PATENT DOCUMENTS

| 6,873,290 B2 | 3/2005 | Anderson et al. |
| 2005/0020276 A1* | 1/2005 | Maanoja et al. ........... 455/456.1 |

(Continued)

FOREIGN PATENT DOCUMENTS

| CN | 1585313 A | 2/2005 |
| CN | 1909717 A | 2/2007 |

(Continued)

OTHER PUBLICATIONS

3rd Generation Partnership Project, "LCS Application Protocol (LCS-AP) between the Mobile Management Entity (MME) and Evolved Serving Mobile Location Centre (E-SMLC); SLs interface", Technical Specification Group Core Network Terminals, Location Services (LCS), Mar. 2010, 3GPP TS 29.171 V9.0.0, (Release 9).

(Continued)

*Primary Examiner* — Kwasi Karikari
(74) *Attorney, Agent, or Firm* — Coats & Bennett, PLLC

(57) ABSTRACT

Teachings herein improve selection of the positioning method(s) used to obtain positioning information responsive to a positioning request, by approaching positioning QoS holistically. Approached holistically, a joint QoS metric as taught herein takes into account the joint effect of individual QoS parameters of a positioning method, or the joint effect of multiple methods in a sequence. Processing in one or more embodiments thus includes determining a joint QoS metric for each of a plurality of candidate positioning methods or sequences, and selecting a positioning method or sequence based on those joint QoS metrics. By selecting a positioning method or sequence in this way, holistically based on joint QoS metrics rather than a piecemeal approach based on a one-by-one check of individual QoS parameters, selection proceeds flexibly according to actual QoS requirements of position-based services and/or systematically according to the joint effect of multiple positioning methods.

20 Claims, 8 Drawing Sheets

(56) References Cited

U.S. PATENT DOCUMENTS

2008/0293436 A1\* 11/2008 Fok et al. .................. 455/456.2
2010/0106806 A1\* 4/2010 Xie et al. ..................... 709/219
2010/0291947 A1\* 11/2010 Annamalai ................ 455/456.1

FOREIGN PATENT DOCUMENTS

| | | |
|---|---|---|
| EP | 1443791 A1 | 8/2004 |
| WO | 99/46947 | 9/1999 |
| WO | 03/005750 A1 | 1/2003 |
| WO | 03/024141 A1 | 3/2003 |

OTHER PUBLICATIONS

European Telecommunications Standards Institute. ETSI TS 125 305, V6.1.0 (Jun. 2004). Universal Mobile Telecommunications System (UMTS); User Equipment (UE) positioning in Universal Terrestrial Radio Access Network (UTRAN); Stage 2 (3GPP TS 25.305 version 6.1.0 Release 6), Jun. 2004.

\* cited by examiner

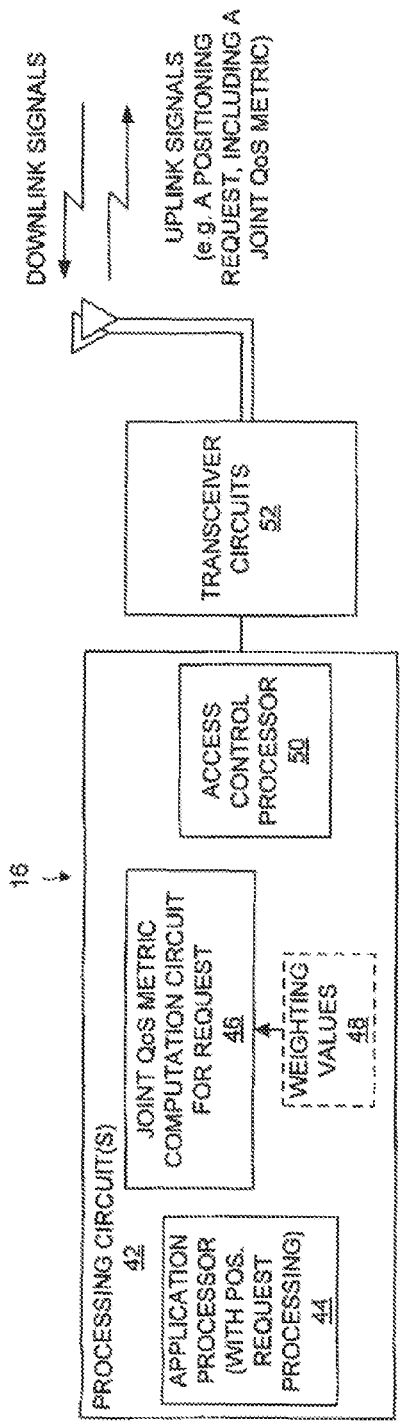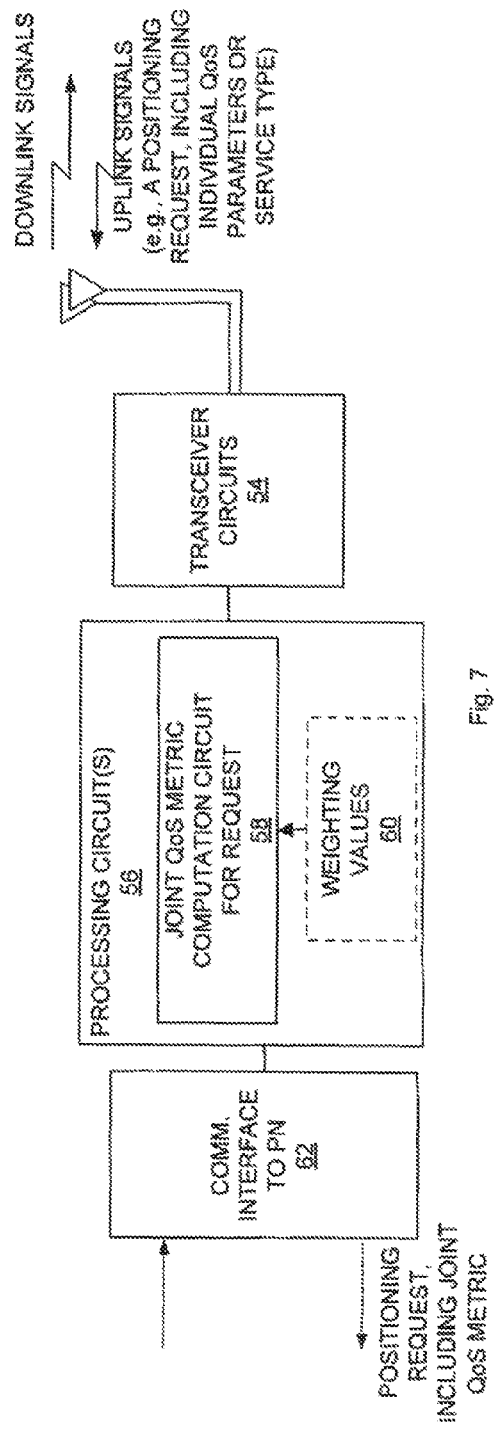
Fig. 6
Fig. 7

ENHANCEMENT OF POSITIONING QUALITY OF SERVICE

FIELD OF THE INVENTION

The present invention generally relates to determining the geographic position of a mobile terminal in a mobile communication network, and particularly relates to enhancing the quality of service with which such a geographic position is determined.

BACKGROUND

Many services offered by a mobile communication network depend on the ability to estimate the geographic position or location of mobile terminals in that network. Navigational assistance, location-aware advertising, social networking, and emergency services are just a few examples. Some of these location services (LCS), like emergency services, demand that a mobile terminal's position be estimated very accurately and very quickly, while others, for example social networking, are less stringent. Typically, then, an entity that requests an estimate of the mobile terminal's position (which may be the mobile terminal itself, or some other entity) specifies exactly how accurate that estimate should be, and how quickly the estimate should be provided, depending on the services for which that estimate will be used.

A number of methods for estimating a mobile terminal's position responsive to a request for that position may be available at any given time, some capable of estimating the position with a better accuracy or response time than others. Methods based on Assisted Global Navigation Satellite System (A-GNSS), for example, rely on a satellite navigation system with the assistance of the mobile communication network to estimate a mobile terminal's position with great accuracy (e.g., within a few meters), albeit with a relatively long response time (e.g., several seconds). By contrast, methods based on Cell ID (CID) simply approximate the mobile terminal's position as being the position of the serving base station and thereby estimate the mobile terminal's position with a short response time, but with poor accuracy. Other positioning methods, such as Time Difference of Arrival (TDOA), Fingerprinting, Angle of Arrival (AoA), Enhanced Cell ID (E-CID), etc., generally fall somewhere between A-GNSS and CID in terms of accuracy and response time.

Accordingly, the task of estimating a mobile terminal's position responsive to a request often entails dynamically selecting from among several available positioning methods the method that satisfies the requested accuracy, the requested response time, and any other requested parameter related to the quality of service (QoS) with which the position is estimated. Known approaches to this selection proceed in a piecemeal fashion, with a one-by-one check of requested QoS parameters against the corresponding QoS parameters of the available positioning methods. That is, the response time of each available positioning method is compared to the requested response time, the accuracy of each method is compared to the requested accuracy, and so on.

Some approaches strictly guarantee all requested QoS parameters. In these approaches, the selected positioning method is the one that fully satisfies all of the requested QoS parameters (e.g., according to the one-by-one check, the method's response time fully satisfies the requested response time and the method's accuracy fully satisfies the requested accuracy). If no method is fully satisfactory, none is selected.

Other approaches guarantee just one requested QoS parameter, and provide a "best effort" with regard to the remaining requested QoS parameters. If the service for which the request is being made is defined as accuracy-critical, for example, these approaches select from among those positioning methods that fully satisfy the requested accuracy, the method that best satisfies the requested response time. On the other hand, if the service for which the request is being made is defined as time-critical, the approaches select from among those positioning methods that fully satisfy the requested response time, the method that best satisfies the requested accuracy.

With positioning method selection approached in these ways, position-based services must be rigidly defined as accuracy-critical, time-critical, or both. This rigid definition is sometimes artificial, though, because some services are in actuality neither accuracy-critical nor time-critical; they may instead just require some minimum combination of accuracy and response time. Known approaches to positioning method selection are therefore inflexible and incapable of intelligently selecting a positioning method based on actual QoS requirements of position-based services.

Known approaches also fail to optimally estimate a mobile terminal's position using multiple positioning methods. Specifically, if the positioning attempt fails with the initially selected positioning method, known approaches re-attempt positioning by selecting a different positioning method. Selection of this different positioning method proceeds in the same manner as described above with respect to the initial selection and occurs independently from the initial selection, except that the same positioning method is not again selected. If the re-attempt also fails, yet another positioning method is selected, and so on. In this way, known approaches create an ad hoc sequence of positioning methods by successively selecting individual positioning methods.

Even though each individual positioning method in the resulting sequence is determined, at the time of its selection, to best satisfy the request, the overall resulting sequence may not be the best sequence to satisfy the request. For example, each individual positioning method in the sequence is selected on the assumption that it will succeed in satisfying the request; a positioning method expected to fail is not selected. However, a positioning method expected to fail may actually be part of the sequence that best satisfies the request, since partial results from that method may be more valuable to subsequently selected methods than partial results from a method assumed to succeed.

Furthermore, known approaches fail to account for or otherwise take advantage of parallel performance of multiple positioning methods, which is possible in the LTE Positioning Protocol (LPP). Indeed, the approaches successively select positioning methods based on the assumption that the methods will be performed serially.

SUMMARY

Teachings herein advantageously provide for improved selection and evaluation of the positioning method(s) used to obtain positioning information responsive to any given positioning request. In one aspect, positioning quality of service (QoS) is viewed holistically for positioning methods, or sequences of positioning methods. Viewed holistically, "joint" positioning QoS as taught herein takes into account the joint effect of individual QoS parameters associated with a given positioning method, or the joint effect of multiple methods in a sequence. The use of joint positioning QoS permits a more intelligent selection of the positioning method, or sequence of positioning methods, to use, for best satisfying the positioning QoS requirements of a positioning request.

In some embodiments, for example, processing for responding to a positioning request includes determining a joint QoS metric for each of a plurality of candidate positioning methods, or sequences of positioning methods. A joint QoS metric for a candidate positioning method, for example, jointly depends on two or more individual QoS parameters associated with that method (e.g., response time, accuracy, etc.). Thus instead of a candidate positioning method being described by several individual QoS parameters, the method is described by a single, joint QoS metric that in a sense represents an overall QoS for that method.

In many embodiments, a joint QoS metric for a candidate sequence of positioning methods is a direct extension of this concept across multiple methods, i.e., a single, joint QoS metric that represents an overall QoS for that sequence. In other embodiments, though, a joint QoS metric for a candidate sequence just represents the accumulation of an individual positioning QoS parameter across the positioning methods in the sequence; that is, the joint effect of the positioning methods on that parameter. In such embodiments, a candidate sequence may be described by several joint QoS metrics, with different joint QoS metrics representing the accumulation of different individual positioning QoS parameters across the positioning methods in the sequence. Nonetheless in all of these embodiments, a joint QoS metric for a candidate sequence jointly depends on two or more positioning methods in that sequence.

Having determined such joint QoS metrics, processing continues in these embodiments with selecting a positioning method or sequence for determining the mobile terminal's position responsive to the request, based on those joint QoS metrics. For example, selection may entail selecting the positioning method or sequence that has the maximum joint QoS metric. Regardless, by selecting a positioning method or sequence in this way, holistically based on joint QoS metrics rather than a piecemeal approach based on a one-by-one check of individual QoS parameters, selection proceeds flexibly according to actual QoS requirements of position-based services and/or systematically according to the joint effect of multiple positioning methods.

In this regard, a joint QoS metric for a given candidate positioning method may be understood in some embodiments as being based on a weighted combination of two or more individual QoS parameters associated with that method. If the individual QoS parameters are expressed in different units (e.g., seconds and meters), the joint QoS metric may be determined as a weighted combination of normalized values for those parameters. These normalized values are dimensionless and may be combined without regard to the units of their associated QoS parameters.

Regardless, with any relative weighting or bias of parameters possible, joint QoS metrics enable intelligent positioning method selection that is based more realistically on actual QoS requirements of position-based services, which may be neither accuracy-critical nor time-critical. In fact, in one or more embodiments, the relative weighting applied to the individual QoS parameters associated with a given candidate positioning method depends on the type of position-based services for which the request was made.

In embodiments where a joint QoS metric is determined for each candidate positioning method or sequence that represents an overall QoS of that method or sequence, positioning method selection entails comparing those joint QoS metrics to similarly computed values associated with the positioning request. A joint QoS metric for the request may be computed by the apparatus carrying out the selection based on that metric, or may alternatively be computed by another apparatus. Accordingly, processing in at least some embodiments includes computing a joint QoS metric for a request, and sending the request and the joint QoS metric to another apparatus for selection based on that metric.

By contrast, in embodiments where a joint QoS metric is determined for each candidate sequence as an accumulation of an individual QoS parameter across the positioning methods in that sequence, selection entails comparing the individual QoS parameters associated with the request to corresponding joint QoS metrics for the sequence. Accordingly, a joint QoS metric is not computed for the positioning request.

Of course, the present invention is not limited by the above features and advantages. Those of ordinary skill in the art will appreciate additional features and advantages upon reading the following detailed description of example embodiments, and reviewing the figures included therein.

BRIEF DESCRIPTION OF THE DRAWINGS

FIG. 6 is a logic flow diagram of a mobile terminal configured to perform the method shown in FIG. 5.

FIG. 7 is a logic flow diagram of an access node configured to perform the method shown in FIG. 5.

DETAILED DESCRIPTION

Figure 1:
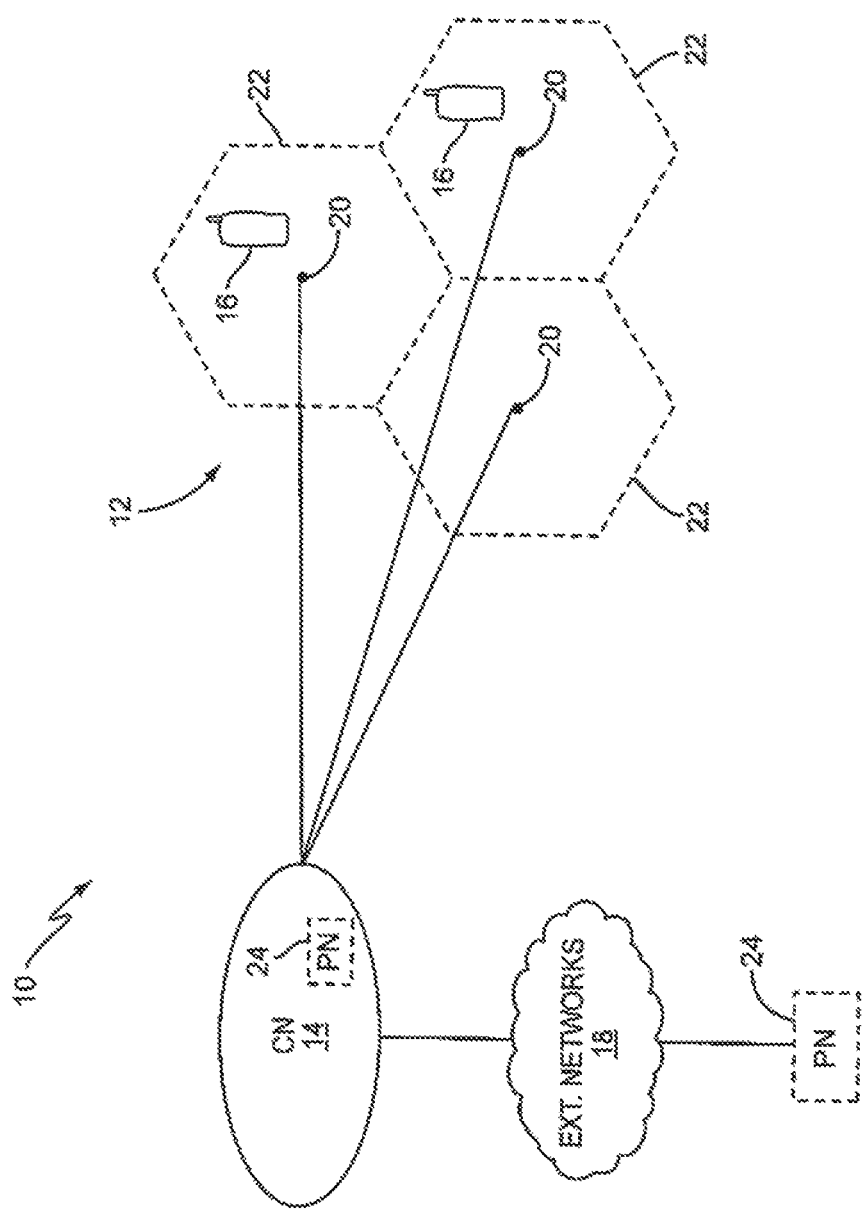
FIG. 1 is a block diagram of a mobile communication network according to various embodiments of the present invention.

FIG. 1 illustrates a mobile communication network 10, which, by way of non-limiting example, may comprise a Long Term Evolution (LTE) network. As depicted, the network 10 includes a Radio Access Network (RAN) 12 and a Core Network (CN) 14. The RAN 12 and the CN 14 communicatively couple mobile terminals 16 in the geographic coverage area of the network 10 to one or more external networks 18, such as the Internet or the Public Switched Telephone Network (PSTN).

To that end, the RAN 12 includes a number of access nodes (ANs) 20—e.g., eNodeBs in an LTE embodiment—distributed across the geographic coverage area of the network 10. The ANs 20 each provide radio communication coverage for one or more portions of that area, referred to as cells 22. Mobile terminals 16 may change their geographic position, moving within or between cells 22, while maintaining communication with the ANs 20.

Capable of estimating the current geographic position of any given mobile terminal 16, the mobile communication network 10 supports a variety of location services (LCS), e.g., emergency services, navigational assistance, and the like. Any authorized electronic processing apparatus, whether internal or external to the network 10, may subscribe to these location services in order to request positioning information for a mobile terminal 16. The requesting apparatus may be, for example, an emergency services network-based entity that requests positioning information when the user of the mobile terminal 16 makes an emergency services call. As another example, the requesting apparatus may be the mobile terminal 16 itself.

Regardless of the particular apparatus originating the request, the request includes or is otherwise associated with two or more individual quality of service (QoS) parameters $p^r$. In some embodiments, one such QoS parameter $p_{time}^r$ relates to how quickly positioning information should be provided in response to the request, i.e., the requested response time expressed in seconds. Other QoS parameters in these embodiments relate to how accurate the positioning information should be. For instance, one QoS parameter $p_{error}^r$ relates to the requested horizontal accuracy of the positioning information, and is expressed as a radius, in meters, of an uncertainty or error circle. A separate QoS parameter $p_{v\_error}^r$ may relate to the requested vertical accuracy of the positioning information.

The positioning request may likewise be accepted by any one of various apparatuses within the network 10 that are configured to estimate the position of the mobile terminal 16 responsive to the request. In some embodiments, for instance, the mobile terminal 16 estimates its own position. In other embodiments, the AN 14 serving the mobile terminal 16 estimates the terminal's position. In still other embodiments, the CN 20 includes or couples the mobile terminal 16 to a special positioning node (PN) 24—e.g., an Evolved Serving Mobile Location Center (E-SMLC) in an LTE embodiment—that is specifically dedicated to estimating the geographic position of the mobile terminal 16.

Whichever apparatus estimates the position of the mobile terminal 16 responsive to the positioning request, be it the mobile terminal 16, the serving AN 20, or the PN 24, that apparatus has available to it a plurality of positioning methods, M, denoted as candidate positioning methods. The apparatus, in some embodiments, estimates the position of the mobile terminal 16 by performing a single one of the candidate positioning methods, e.g., m∈M. In other embodiments, the apparatus estimates the position by performing some combination of multiple positioning methods, e.g., (m, n, ...) ∈M, either serially in a defined order or in parallel. With a plurality of combinations possible, each such combination is referred to herein as a candidate sequence of positioning methods.

Notably, the selection of which candidate positioning method, or candidate sequence of positioning methods, to perform for best satisfying the QoS parameters $p^r$ of the positioning request proceeds in a more intelligent manner than known selection approaches. In this regard, positioning QoS is viewed holistically for candidate positioning methods, or candidate sequences, according to the processing illustrated in FIG. 2.

Figure 2:
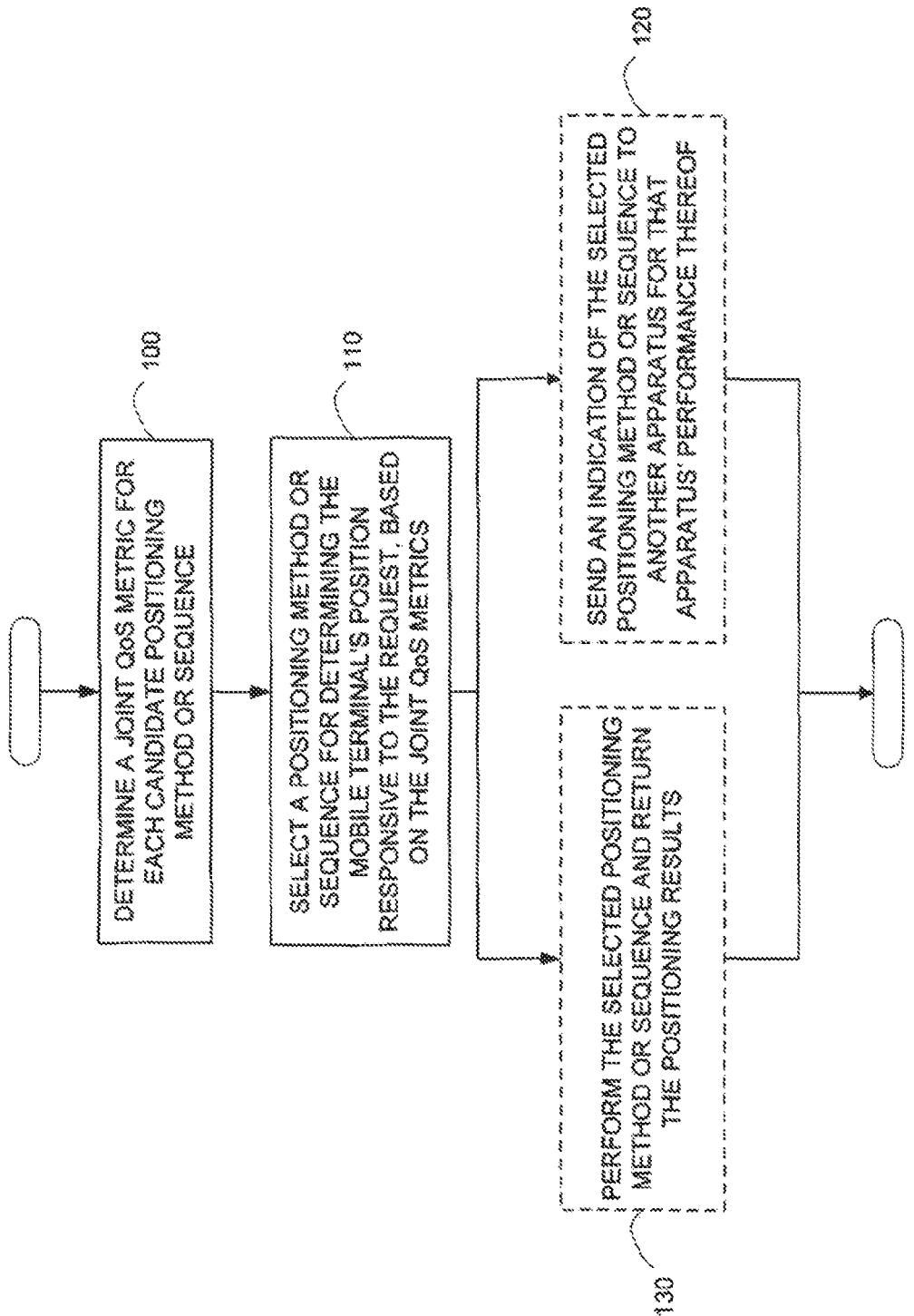
FIG. 2 is a logic flow diagram of a method implemented by an electronic processing apparatus for responding to a request for a mobile terminal's geographic position, according to some embodiments of the present invention.

In FIG. 2, processing "begins" by determining a joint QoS metric J for each of a plurality of candidate positioning methods, or candidate sequences of positioning methods (Block 100). A joint QoS metric $J^m$ for a candidate positioning method m jointly depends on two or more individual QoS parameters $p^m$ associated with that method. Thus instead of a candidate positioning method m being described by several individual QoS parameters, e.g., $p_{time}^m$ and $p_{error}^m$, the method is described by a single, joint QoS metric $J^m$ that in a sense represents an overall QoS for that method.

In many embodiments, a joint QoS metric $J^{(m, n, \cdots)}$ for a candidate sequence of positioning methods (m, n, ...) is a direct extension of this concept across multiple methods, i.e., a single, joint QoS metric $J^{(m, n, \cdots)}$ that represents an overall QoS for that sequence. In other embodiments, though, a joint QoS metric $J^{(m, n, \cdots)}$ for a candidate sequence just represents the accumulation of an individual positioning QoS parameter p across the positioning methods in the sequence; that is, the joint effect of the positioning methods on that parameter p. In such embodiments, a candidate sequence may be described by several joint QoS metrics $J^{(m, n, \cdots)}$, with different joint QoS metrics $J^{(m, n, \cdots)}$ representing the accumulation of different individual positioning QoS parameters p across the positioning methods in the sequence. The description herein will distinguish between these embodiments, primarily for convenience, by denoting a joint QoS metric that represents an overall QoS for the sequence simply as $J^{(m, n, \cdots)}$ and denoting a joint QoS metric that represents the accumulation of an individual positioning QoS parameter p across the positioning methods in the sequence as $J_p^{(m, n, \cdots)}$. Nonetheless in all of these embodiments a joint QoS metric for a candidate sequence, whether denoted as $J^{(m, n, \cdots)}$ or $J_p^{(m, n, \cdots)}$, jointly depends on two or more positioning methods in that sequence.

Having determined a joint QoS metric J for each candidate positioning method, or candidate sequence of positioning methods, processing "continues" with selecting a positioning method or sequence for determining the mobile terminal's position responsive to the request, based on those joint QoS metrics J (Block 110). For example, in some embodiments, described more fully below, this selection entails selecting the positioning method or sequence that has the maximum joint QoS metric J. Regardless, by selecting a positioning method or sequence in this way, holistically based on joint QoS metrics J, selection proceeds flexibly according to actual QoS requirements of position-based services and/or systematically according to the joint effect of multiple positioning methods.

The above processing may be carried out in any one of various electronic processing apparatuses within the network 10, not just the apparatus that ultimately performs the selected positioning method or sequence. That is, the above processing may be carried out in some embodiments in a network node, such as an AN 20 or Mobility Management Entity (MME) in an LTE embodiment, while actual performance of the selected positioning method or sequence is carried out in another node, such as the PN 24. In these embodiments, the processing may "end" with sending an indication of the selected positioning method or sequence to another apparatus, e.g., the PN 24, for that apparatus' performance thereof (Block 120). Of course, the processing may alternatively be carried out in the apparatus that actually performs the selected positioning method or sequence, e.g., the PN 24, such that processing "ends" with performing the selected positioning method or sequence, and then returning the positioning results (Block 130).

Figure 3:
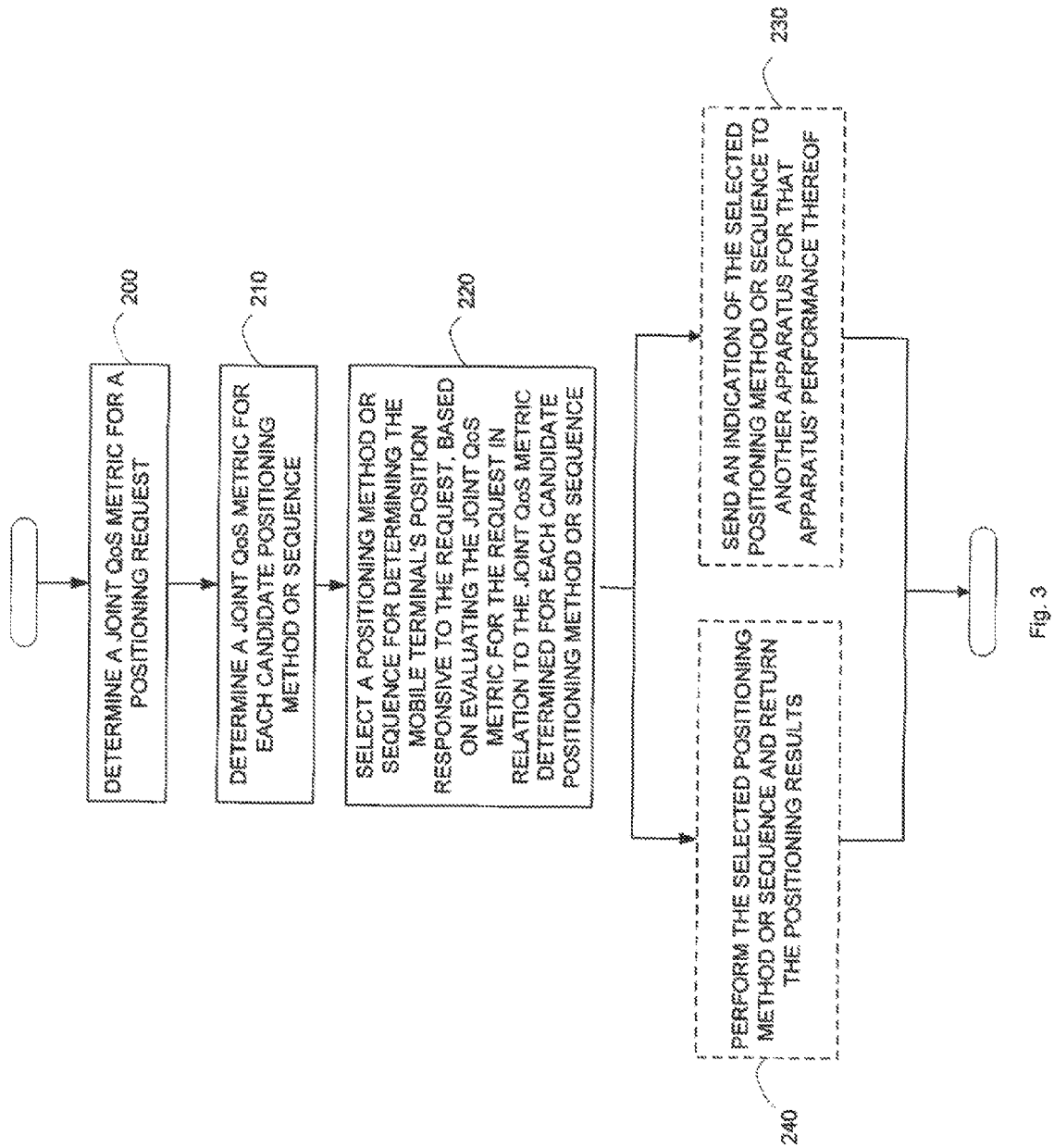
FIG. 3 is a logic flow diagram of a method for responding to a positioning request according to other embodiments of the present invention.

FIG. 3 illustrates additional details of certain embodiments mentioned above, namely those directed to joint QoS metrics that represent overall QoS's of candidate positioning methods or sequences, e.g., where a joint QoS metric is denoted as $J^m$ for a candidate positioning method m or as $J^{(m, n, \cdots)}$ for a candidate positioning sequence (m, n, ...). As shown in FIG. 3, selection processing in these embodiments may further include determining a joint QoS metric $J^r$ for a positioning request (Block 200). This joint QoS metric $J^r$ jointly depends on two or more individual QoS parameters $p^r$ associated with the request. Thus, instead of the positioning request being described by several individual QoS parameters, e.g., $p_{time}^r$ and $p_{error}^r$, the request is described by a single, joint QoS metric $J^r$ that in a sense represents an overall QoS for the request.

Accordingly, having determined a joint QoS metric for each candidate positioning method or sequence as described above (Block 210), processing "continues" in the apparatus with selecting a positioning method or sequence based on evaluating the joint QoS metric $J^r$ for the request in relation to the joint QoS metric determined for each candidate positioning method (i.e., $J^m$), or each candidate sequence (i.e., $J^{(m, n, \cdots)}$) (Block 220). This may entail, for instance, comparing the joint QoS metric $J^r$ for the request to the joint QoS metrics for the candidate positioning methods (i.e., $J^m$), or candidate sequences (i.e., $J^{(m,n,\cdots)}$), and selecting the method or sequence that best satisfies the joint QoS metric $J^r$ for the request according to some selection criteria.

In some embodiments, for example, the apparatus selects the method or sequence that has the maximum joint QoS metric in relation to the joint QoS metric $J^r$ for the request. Ties between multiple methods that have the same joint QoS metric $J^m$ may be broken by comparison of an individual QoS parameter $p^m$ associated with the methods, e.g., response time $p_{time}^m$. Similarly, ties between multiple sequences that have the same joint QoS metric $J^{(m, n, \cdots)}$ may be broken by comparison of an individual QoS parameter $p$ as accumulated across the methods in each sequence. Indeed, in at least one embodiment, if multiple methods or sequences each have the maximum joint QoS metric, the apparatus selects from among those multiple methods or sequences the one that has the minimum response time.

In other embodiments, the apparatus considers the cost of performing the candidate positioning methods or sequences in terms of processing resources used, rather than simply selecting the method or sequence that yields the maximum joint QoS. In these embodiments, each candidate positioning method or sequence has a cost c associated with its performance. Having compared the joint QoS metric $J^r$ for the request to the joint QoS metrics for the candidate positioning methods (i.e., $J^m$), or candidate sequences (i.e., $J^{(m, n, \cdots)}$), the apparatus selects from among those candidate positioning methods or sequences that have a joint QoS metric at least as great as the joint QoS metric $J^r$ for the request, the method or sequence that has the minimum cost c.

Processing in the apparatus may then proceed as already discussed; that is, by either sending an indication of the selected positioning method or sequence to another apparatus for that apparatus' performance thereof (Block 230), or by performing the selected positioning method or sequence itself, and returning the positioning results (Block 240).

As used herein to describe the apparatus' processing in FIG. 3, determining a joint QoS metric $J^r$ for a positioning request (i.e., Block 200) may comprise either actually computing that joint QoS metric $J^r$ or simply receiving the joint QoS metric $J^r$ from another apparatus. In embodiments where processing includes computing the joint QoS metric $J^r$ for the request, processing may further include determining or otherwise obtaining values for the individual QoS parameters $p^r$ associated with the request, so that the joint QoS metric $J^r$ can be computed in joint dependence on those parameters $p^r$. These values can be directly or indirectly signalled to the apparatus in any number of ways. As examples of direct signalling, the parameters $p^r$ can be included in the positioning request or received separately. As an example of indirect signalling, information related to the type of position-based services that the request is for can be received as part of the request, or separately. In this case, processing may include mapping that type information to individual QoS parameters $p^r$, which are then used to compute the joint QoS metric $J^r$ for the request.

Figure 4:
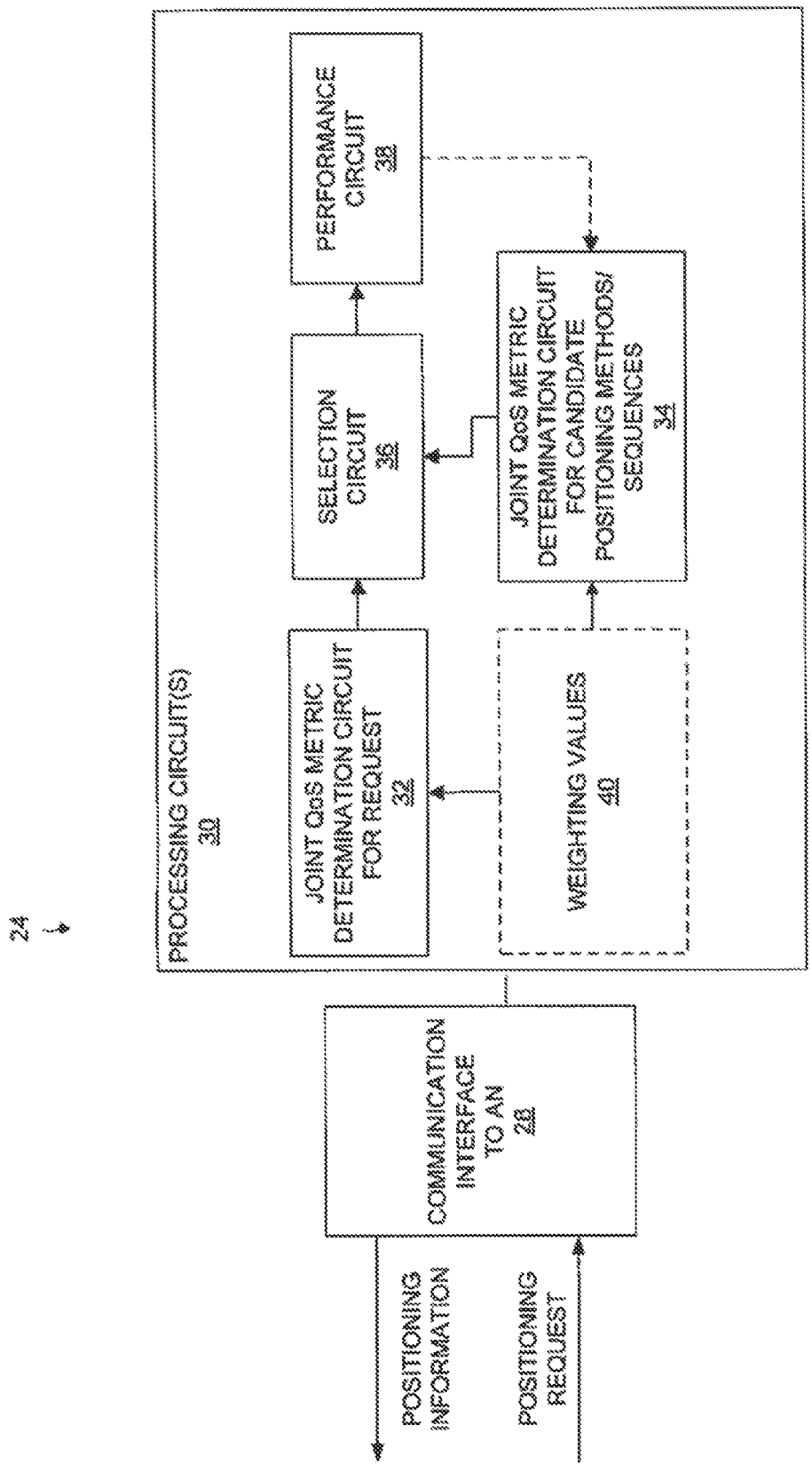
FIG. 4 is a block diagram of a positioning node configured to perform the method shown in FIG. 3.

In view of the above modifications and variations to the processing in FIG. 3, FIG. 4 illustrates an example of an electronic processing apparatus configured to carry out such processing. Specifically, FIG. 4 depicts an example of the PN 24, which according to one or more embodiments is configured to carry out the processing in FIG. 3. The PN 24 as shown includes a communication interface 28 that communicatively couples the PN 24 to one or more ANs 20, or other nodes. The PN 24 also includes one or more processing circuits 30, such as microprocessors or other computer/digital processing circuits, that are configured to carry out the processing in FIG. 3, responsive to receiving a positioning request for a mobile terminal 16 via the communication interface 28.

The processing circuit(s) 30 as depicted are at least logically divided into various circuits, including a joint QoS determination circuit 32 configured to determine a joint QoS metric $J^r$ for the positioning request as discussed above. The joint QoS determination circuit 32 may simply receive the joint QoS metric $J^r$ as part of or in conjunction with the positioning request. Alternatively, the joint QoS determination circuit 32 may determine individual QoS parameters p for the request and use those parameters to compute the joint QoS metric $J^r$.

The processing circuit(s) 30 further include a joint QoS determination circuit 34 configured to determine a joint QoS metric for each candidate positioning method or sequence. A selection circuit 36 receives as input the joint QoS metric $J^r$ determined for the positioning request and the joint QoS metric determined for each candidate positioning method or sequence. Then, after selecting a positioning method or sequence for determining the mobile terminal's position, the selection circuit 36 provides the selected method or sequence to a performance circuit 38. The performance circuit 38 performs the selected method or sequence to obtain positioning information for the mobile terminal 16. The PN 24 returns this positioning information in response to the request, either to the apparatus that originated the request or to still another apparatus.

In one or more embodiments, the joint QoS metric determination circuit 34 dynamically computes joint QoS metrics for the candidate positioning methods or sequences on the fly, or alternatively, maintains pre-computed values for those metrics. For example, the joint QoS metric determination circuit 34 may maintain a data table or other such data structure in non-volatile memory or other storage, which contains joint QoS metrics for each positioning method or sequence supported by the PN 24.

Because the achieved quality for various QoS parameters that are obtained by a given sequence of positioning methods depends in some cases on the particular performance order of those methods (or whether they are performed in parallel), the joint QoS metric determination circuit 34 may store different joint QoS metrics for each sequence of methods defined by the PN 24. Further, even where the joint QoS metric determination circuit 34 stores pre-computed values for the joint QoS metrics of its defined methods or sequences, the circuit 34 may be configured to dynamically updated those metrics as part of its ongoing operations, based on the actual positioning results achieved by the performance circuit 38.

Whether the joint QoS metrics for the candidate positioning methods or sequences are computed or retrieved from storage, they are, as noted above, "joint" in the sense that they depend on two or more individual QoS parameters, or two or more positioning methods. Consider first, for instance, a joint QoS metric $J^m$ for a candidate positioning method m. In some embodiments, the joint QoS metric $J^m$ is based on a weighted combination of the individual QoS parameters $p^m$ associated with that method, e.g.:

$$J^m = \alpha \cdot p_{time}^m + (1-\alpha) \cdot p_{error}^m, \quad (1)$$

where any relative weighting combination is possible, based on $\alpha \in [0,1]$.

With $\alpha=1$, the joint QoS metric $J^m$ fully prioritizes the response time $p_{time}^m$ of the candidate positioning method, meaning that the method will not be selected unless it fully satisfies the requested response time $p_{time}^r$, as is the case for time-critical services. Conversely, with $\alpha=0$, the joint QoS metric $J^m$ fully prioritizes the accuracy $p_{error}^m$ of the candidate positioning method, meaning that the method will not be selected unless it fully satisfies the requested accuracy $p_{error}^r$, as is the case for accuracy-critical services. By setting $\alpha$ to any other value, an intermediate, fractional weight may be applied to the response time $p_{time}^m$ and accuracy $p_{error}^m$ of the candidate positioning method, to express a bias or preference toward response time or accuracy. With any relative weighting or bias possible, joint QoS metrics enable intelligent positioning method selection that is based more realistically on actual QoS requirements of position-based services, which may be neither accuracy-critical nor time-critical.

In fact, in one or more embodiments, the relative weighting $\alpha$ applied to the individual QoS parameters $p^m$ associated with a given candidate positioning method m depends on the type of position-based services for which the request was made. Example service types may include emergency services, traffic information, asset management, friend finding, weather, etc., as specified in 3GPP Technical Specification 22.071. The service type may be included in or otherwise accompany the positioning request, and may map to a specific weighting $\alpha$ to apply for joint QoS metric computation.

In other embodiments, the relative weighting $\alpha$ is signalled as part of a positioning request (e.g., from a Mobility Management Entity (MME) to the PN 24). The relative weighting $\alpha$ may alternatively be signalled as part of a positioning provide information message (e.g., from a mobile terminal 16 to the PN 24). In yet other embodiments, the relative weighting $\alpha$ is signalled as a requested parameter in a positioning provide information request (e.g., as a binary indicator which is TRUE if the parameter is requested).

Accordingly, in embodiments where the PN 24 in FIG. 4 computes the joint QoS metrics, the PN 24 includes weighting values 40, which may be expressed as different sets of weighting values to be applied. The joint QoS metric determination circuit 34 may compute a joint QoS metric $J^m$ for a candidate positioning method m by determining a service type of the positioning request and determining a set of weighting values 40 based on that service type. Alternatively, the joint QoS metric determination circuit 34 may receive one or more parameters indicative of those weighting values 40 (e.g., via the signalling just described). In either case, the joint QoS metric determination circuit 34 may then compute the joint QoS metric $J^m$ as a weighted combination of the individual QoS parameters $p^m$ associated with that method according to equation (1), with the determined set of weighting values 40 as $\alpha$, $(1-\alpha)$, etc.

Of course, equation (1) represents just one example of a joint QoS metric $J^m$ for a candidate positioning method m, where the method is only associated with two individual QoS parameters $p_{time}^m$ and $p_{error}^m$. In other embodiments, the method may be associated with more than two individual QoS parameters, e.g., $p_{time}^m$, $p_{error}^m$, and $p_{v\_error}^m$. In this case, equation (1) may be extended as:

$$J^m = \alpha \cdot p_{time}^m + (1-\alpha-\alpha_{v\_error}) \cdot p_{error}^m + \alpha_{v\_error} \cdot p_{v\_error}^m \quad (2)$$

where $\alpha + \alpha_{v\_error} \le 1$. For ease of illustration, however, this description will simply use examples with two individual QoS parameters.

Especially as the number of individual QoS parameters $p^m$ increases, though, those parameters $p^m$ may be expressed in different units (e.g., seconds for response time, meters for accuracy/error). In one or more embodiments, therefore, a joint QoS metric $J^m$ for a candidate positioning method m is determined as a weighted combination of normalized values $\hat{p}^m$ for those parameters:

$$J^m = \alpha \cdot \hat{p}_{time}^m + (1-\alpha) \cdot \hat{p}_{error}^m \quad (3)$$

These normalized values $\hat{p}^m$ are dimensionless and may be weightedly combined without regard to the units of their associated QoS parameters $\hat{p}^m$.

In some embodiments, for example, normalized values $\hat{p}^m$ are obtained by normalizing individual QoS parameters $p^m$ with respect to pre-determined reference values $p^{ref}$ that have units corresponding to those of the QoS parameters $p^m$, e.g.:

$$\hat{p}_{time}^m = \frac{p_{time}^{ref}}{p_{time}^m} \quad (4)$$

$$\hat{p}_{error}^m = \frac{p_{error}^{ref}}{p_{error}^m}$$

The normalized values $\hat{p}^m$ in these embodiments express the individual QoS parameters $p^m$ as dimensionless ratios. Such dimensionless ratios describe the extent to which the individual QoS parameters $p^m$ satisfy or otherwise meet the corresponding pre-determined reference values $p^{ref}$.

With the individual QoS parameters $p^m$ normalized in this way, and with the joint QoS metric $J^m$ calculated as in equation (3), a candidate positioning method m that has, e.g., a quicker response time $p_{time}^m$ than the pre-determined reference response time $p_{time}^{ref}$ (i.e., $\hat{p}_{time}^m > 1$), but a greater error $p_{error}^m$ than the pre-determined reference error $p_{error}^{ref}$ (i.e., $\hat{p}_{error}^m > 1$), could have the same resulting joint QoS metric as another method n that has the same response time $p_{time}^n$ as the pre-determined reference response time $p_{time}^{ref}$ (i.e., $\hat{p}_{time}^n = 1$) and the same error $p_{error}^n$ as the pre-determined reference error $p_{error}^{ref}$ (i.e., $\hat{p}_{error}^n = 1$). That is, better quality with respect to one QoS parameter can in a sense "make up" for lesser quality with respect to a different QoS parameter.

In some cases this may be undesirable. Thus according to other embodiments, a joint QoS metric $J^m$ is determined according to:

$$J^m = \alpha \cdot \min(\hat{p}_{time}^m, 1) + (1-\alpha) \cdot \min(\hat{p}_{error}^m, 1), \quad (5)$$

where the min function prevents one QoS parameter that has better quality from making up for another QoS parameter that has lesser quality.

Consider now a joint QoS metric $J^{(m, n, \ldots)}$ for a candidate sequence of positioning methods (m, n, . . . ), which by extension of the above concepts is a single, joint QoS metric that represents an overall QoS for that sequence. In some embodiments, the joint QoS metric $J^{(m, n, \ldots)}$ jointly depends on two or more joint QoS metrics $J_p^{(m, n, \ldots)}$, which each comprise the accumulation of a different individual positioning QoS parameter p across the positioning methods in the sequence. A joint QoS metric $J_{time}^{(m, n, \ldots)}$, for example, comprises the accumulation of the QoS parameter $p_{time}$ across the positioning methods in the sequence:

$$J_{time}^{(m,n,\ldots)} = p_{time}^{m} + p_{time}^{n} + \ldots, \text{ for serial performance of the methods } m, n, \ldots$$

$$J_{time}^{(m,n,\ldots)} = \max(p_{time}^{m}, p_{time}^{n}, \ldots), \text{ for parallel performance of the methods } m, n, \ldots \quad (6)$$

Likewise, a joint QoS metric $J_{error}^{(m, n, \ldots)}$ comprises the accumulation of the QoS parameter $p_{error}$ across the positioning methods in the sequence:

$$J_{error}^{(m,n,\ldots)} = \min(p_{error}^{m}, p_{error}^{n}, \ldots), \text{ for independent performance of the methods } m, n, \ldots$$

$$J_{error}^{(m,n,\ldots)} \leq \min(p_{error}^{m}, p_{error}^{n}, \ldots), \text{ for hybrid performance of the methods } m, n, \ldots, \quad (7)$$

where hybrid performance of the methods entails using the partial results of one method to aid or otherwise assist the performance of another method in the sequence. Similar to the embodiments described above, the joint QoS metrics $J_p^{(m, n, \ldots)}$ may be based on normalized values of the QoS parameters $p_{time}$ and $p_{error}$, e.g., $\hat{p}_{time}^{m}, \hat{p}_{time}^{n}, \ldots$ and $\hat{p}_{error}^{m}, \hat{p}_{error}^{n}, \ldots$.

The joint QoS metric $J^{(m, n, \ldots)}$ for the candidate sequence (m, n, . . . ) may then be based on a weighted combination of these two or more joint QoS metrics $J_p^{(m, n, \ldots)}$:

$$J^{(m,n,\ldots)} = \alpha \cdot \min(J_{time}^{(m,n,\ldots)}, 1) + (1-\alpha) \cdot \min(J_{error}^{(m,n,\ldots)}, 1), \quad (8)$$

where, again, any relative weighting combination is possible, based on $\alpha \in [0,1]$. The weighting values $\alpha$, $\alpha-1$, . . . may in much the same way as previously described permit a bias or preference toward the overall response time or accuracy provided by the candidate sequence, and may depend on the service type of the positioning request.

With the overall QoS of candidate positioning methods or sequences described according to joint QoS metrics ($J^m$ for methods and $J^{(m, n, \ldots)}$ for sequences), selection can proceed holistically, based on evaluating the joint QoS metric $J^r$ for the request in relation to the joint QoS metrics for the candidate methods or sequences. In this regard, the joint QoS metric $J^r$ for the request can be computed in much the same way as a joint QoS metric $J^m$ for a given candidate positioning method. That is, the joint QoS metric $J^r$ for the request in one or more embodiments is computed based on a weighted combination of two or more individual positioning QoS parameters $p^r$ associated with the request:

$$J^r = \alpha \cdot \min(\hat{p}_{time}^{r}, 1) + (1-\alpha) \cdot \min(\hat{p}_{error}^{r}, 1) \quad (9)$$

where the QoS parameters have been normalized and weighted in the same manner as those of the candidate positioning methods or sequences.

Referring briefly again to FIG. 4, and with the above details in mind, the PN 30 may compute any of these joint QoS metrics $J^r$, $J^m$, $J^{(m, n, \ldots)}$, or may alternatively receive them from another apparatus. In particular embodiments, for example, the PN 30 receives the joint QoS metric $J^r$ for the request from another apparatus, e.g., a mobile terminal 16 or an AN 20, with that apparatus being the entity that computes the metric.

Figure 5:
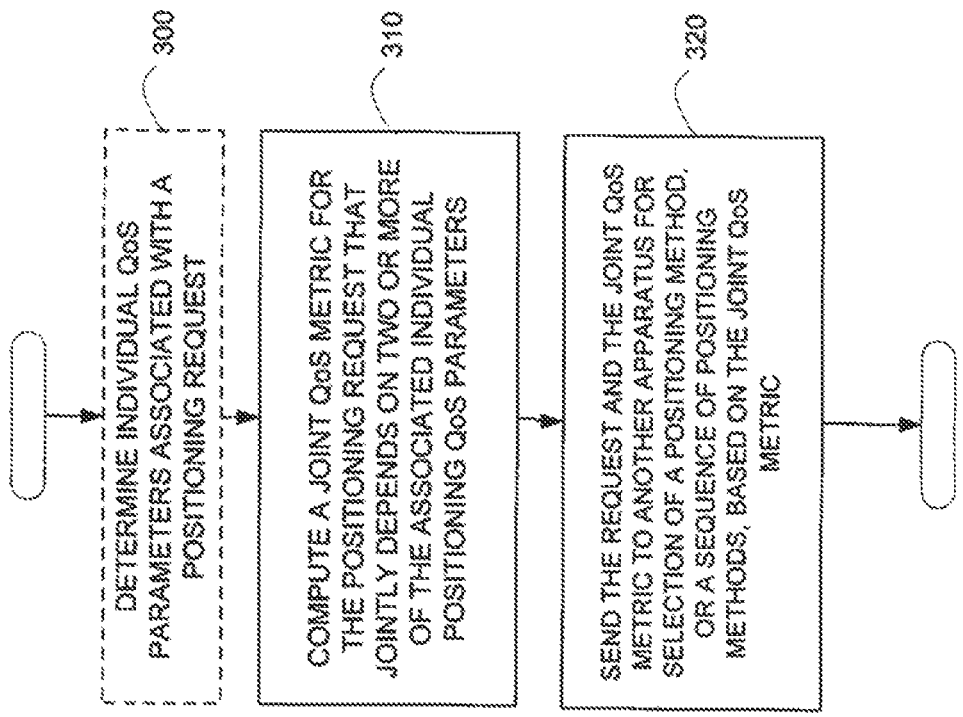
FIG. 5 is a logic flow diagram of a method for responding to a positioning request according to still other embodiments of the present invention.

FIG. 5 illustrates processing carried out in such an apparatus according to one or more embodiments. As depicted in FIG. 5, processing may optionally begin with determining individual QoS parameters $p^r$ associated with a positioning request (Block 300). Processing "continues" with computing a joint QoS metric $J^r$ for the request that jointly depends on the two or more individual QoS parameters $p^r$ (Block 310). Finally, processing "ends" with sending the request and the joint QoS metric $J^r$ to another apparatus for selection of a positioning method, or a sequence of positioning methods, based on the joint QoS metric $J^r$ (Block 320).

FIG. 6 illustrates an example of an electronic processing apparatus configured to carry out such processing. Specifically, FIG. 6 depicts an example of a mobile terminal 16, which according to one or more embodiments is configured to carry out the processing in FIG. 5, in conjunction with sending a positioning request to its supporting network. The mobile terminal 16 as shown includes one or more processing circuits 42 that are at least logically divided into various circuits, including an application processor 44 that may trigger the sending of the positioning request. A software application running on the application processor 44 may, for instance, be or use a position-based service, and thereby trigger the sending of the positioning request, for use by that service.

The one or more processing circuits 42 also include a joint QoS metric computation circuit 46 configured to compute a joint QoS metric $J^r$ for the request, e.g., in accordance with weighting values 48. For example, in some embodiments, the joint QoS metric computation circuit 42 determines a service type of the request and determines weighting values 48 based on that service type, such as by mapping the service type to a particular set of weighting values. The determination circuit 42 then computes the joint QoS metric $J^r$ as a weighted combination of the two or more individual positioning QoS parameters $p^r$, according to those weighting values 48.

The one or more processing circuits 42 further include an access control processor 50 that implements the air interface protocols, including any encryption and authentication processing, needed to send uplink signals to an AN 20 via transceiver circuits 52 and one or more associated antennas. By way of these circuits, the processing circuit(s) 42 send the positioning request and the joint QoS metric $J^r$ computed for the request to another apparatus, e.g., an AN 20 or the PN 24, for selection of a positioning method, or sequence of positioning methods, based on that joint QoS metric. Thus, the mobile terminal 16 configured as described above may originate a positioning request that includes or is accompanied by a joint QoS metric $J^r$, for greatly improved selection of the positioning method or sequence used to respond to the request.

FIG. 7 depicts an example of an AN 20, which according to one or more other embodiments is configured to carry out the processing in FIG. 5. The AN 20 includes one or more antennas and transceiver circuits 54 configured to receive uplink signals from a mobile terminal 16, which may include a positioning request. In some embodiments, the positioning request includes or otherwise accompanies a joint QoS metric $J^r$ for the request; in these cases, the AN 20 simply passes the request along to, e.g., the PN 24. In other embodiments, the positioning request does not accompany a joint QoS metric $J^r$, but instead only accompanies individual QoS parameters or a service type. In these embodiments, the AN 20 is configured to itself compute the joint QoS metric $J^r$.

To that end, the AN 20 includes one or more processing circuits 56 that are at least logically divided into various circuits, including a joint QoS metric computation circuit 58 configured to compute a joint QoS metric $J^r$ for the request, e.g., in accordance with weighting values 60. For example, in some embodiments, the joint QoS metric computation circuit 58 determines a service type of the request and determines weighting values 60 based on that service type, such as by mapping the service type to a particular set of weighting values. The determination circuit 58 then computes the joint QoS metric $J^r$ as a weighted combination of the two or more individual positioning QoS parameters $p^r$, according to those weighting values 60.

The AN 20 further include a communication interface 62 that is configured to send the positioning request and the joint QoS metric $J^r$ computed for the request to another apparatus, e.g., the PN 24, for selection of a positioning method, or sequence of positioning methods, based on that joint QoS metric.

With the above variations in mind, it should be understood that the joint QoS metric $J^r$ for any given positioning request is computed by the mobile terminal 16 in some embodiments, is computed in the RAN 12 in other embodiments, e.g., at an AN 20 or Mobility Management Entity (MME), and is computed in the CN 24 in still other embodiments, e.g., at the PN 24. Further, it may be that the apparatus that computes the joint QoS metric $J^r$ for a given positioning request changes, based on the type of position-based service or other circumstances associated with the request.

Figure 8:
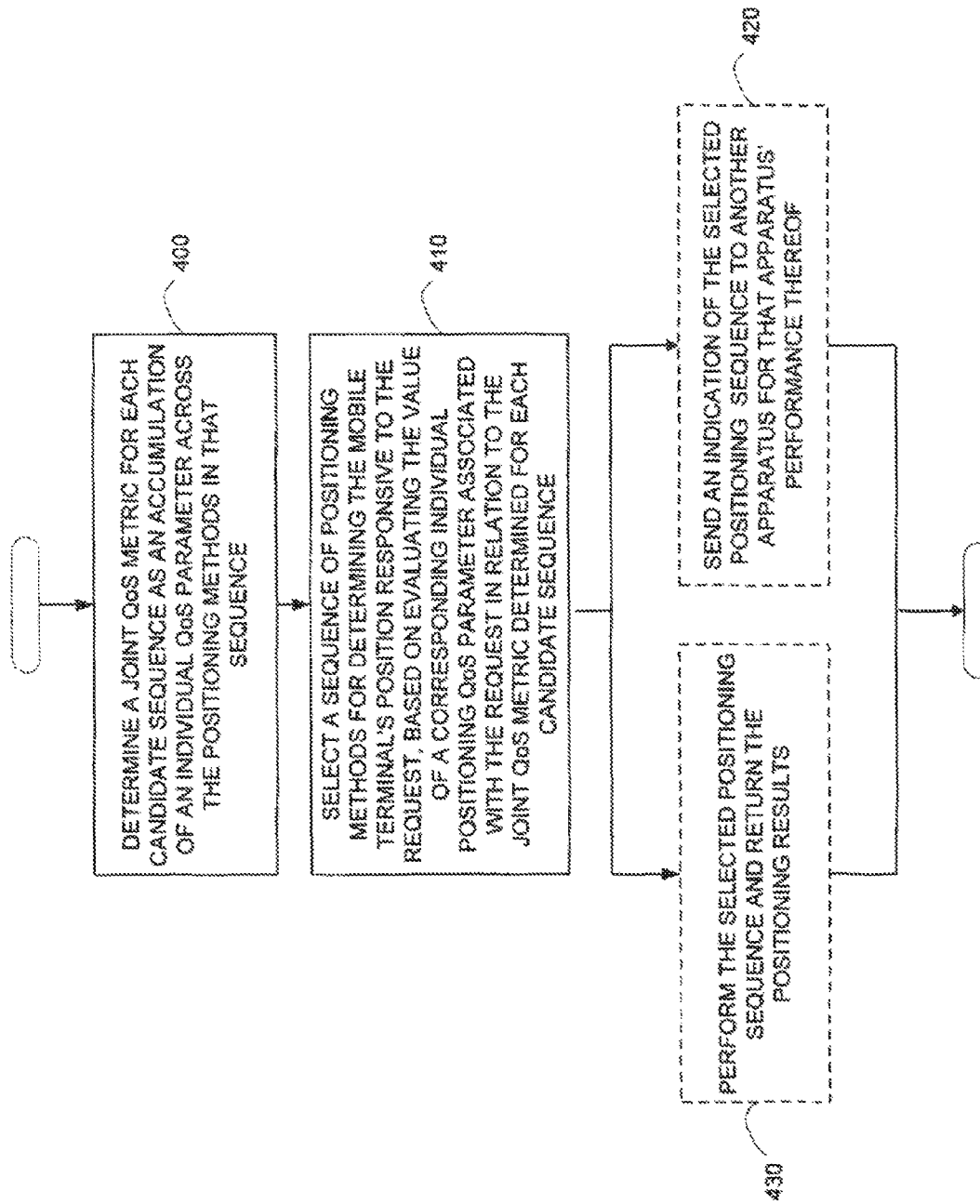
FIG. 8 is a logic flow diagram of a method for responding to a positioning request according to yet other embodiments of the present invention.

Discussion now shifts to embodiments directed to joint QoS metrics $J_p^{(m,n,\cdots)}$ for a candidate sequence that just represent the accumulation of an individual positioning QoS parameter p across the positioning methods in the sequence, rather than representing an overall QoS for the sequence. In such embodiments, a candidate sequence may be described by several joint QoS metrics $J_p^{(m,n,\cdots)}$, with different joint QoS metrics $J_p^{(m,n,\cdots)}$ presenting the accumulation of different individual positioning QoS parameters p across the positioning methods in the sequence. Furthermore, in these embodiments, a joint QoS metric $J^r$ is not computed for a positioning request. Rather, the individual positioning QoS parameters $p^r$ associated with the request are themselves evaluated in relation to corresponding joint QoS metrics $J_p^{(m,n,\cdots)}$ for the sequence. FIG. 8 illustrates selection processing according to these embodiments.

As shown in FIG. 8, processing "begins" with determining a joint QoS metric $J_p^{(m,n,\cdots)}$ for each candidate sequence as an accumulation of an individual positioning QoS parameter p across the positioning methods in that sequence (Block 400). This individual QoS parameter may be, for example, $p_{time}$. In that case, processing entails determining a joint QoS metric $J_{time}^{(m,n,\cdots)}$ for each candidate sequence. The joint QoS metric $J_{time}^{(m,n,\cdots)}$ for a given one of those sequences comprises the accumulation of the QoS parameter $p_{time}$ across the positioning methods in the sequence:

$$J_{time}^{(m,n,\cdots)} = p_{time}^m + p_{time}^n + \ldots, \text{ for serial performance of the methods } m,n, \ldots.$$

$$J_{time}^{(m,n,\cdots)} = \max(p_{time}^m, p_{time}^n, \ldots), \text{ for parallel performance of the methods } m,n, \ldots.$$

Regardless, the joint QoS metrics $J_{time}^{(m,n,\cdots)}$ may be based on normalized values of the QoS parameter $p_{time}$, e.g., $\hat{p}_{time}^m$, $\hat{p}_{time}^n$, ....

Processing then "continues" with selecting a sequence of positioning methods for determining the mobile terminal's position responsive to the request, based on evaluating the value of a corresponding individual positioning QoS parameter associated with the request, e.g., $p_{time}^r$, in relation to the joint QoS metrics determined for each candidate sequence, e.g., $J_{time}^{(m,n,\cdots)}$ (Block 410). This selection may entail, for example, selecting the candidate sequence that, according to the joint QoS metrics $J_{time}^{(m,n,\cdots)}$, has fastest total response time in relation to the requested response time $p_{time}^r$. Of course, as a candidate sequence may be described by multiple joint QoS metrics $J_p^{(m,n,\cdots)}$ in these embodiments, e.g., both $J_{time}^{(m,n,\cdots)}$ and $J_{error}^{(m,n,\cdots)}$, selection may also be based on evaluating the value of other individual positioning QoS parameters associated with the request, e.g., $p_{error}^r$ in relation to those other joint QoS metrics.

Processing in the apparatus may nonetheless proceed as already discussed; that is, by either sending an indication of the selected positioning sequence to another apparatus for that apparatus' performance thereof (Block 420), or by performing the selected positioning sequence itself, and returning the positioning results (Block 430).

Figure 9:
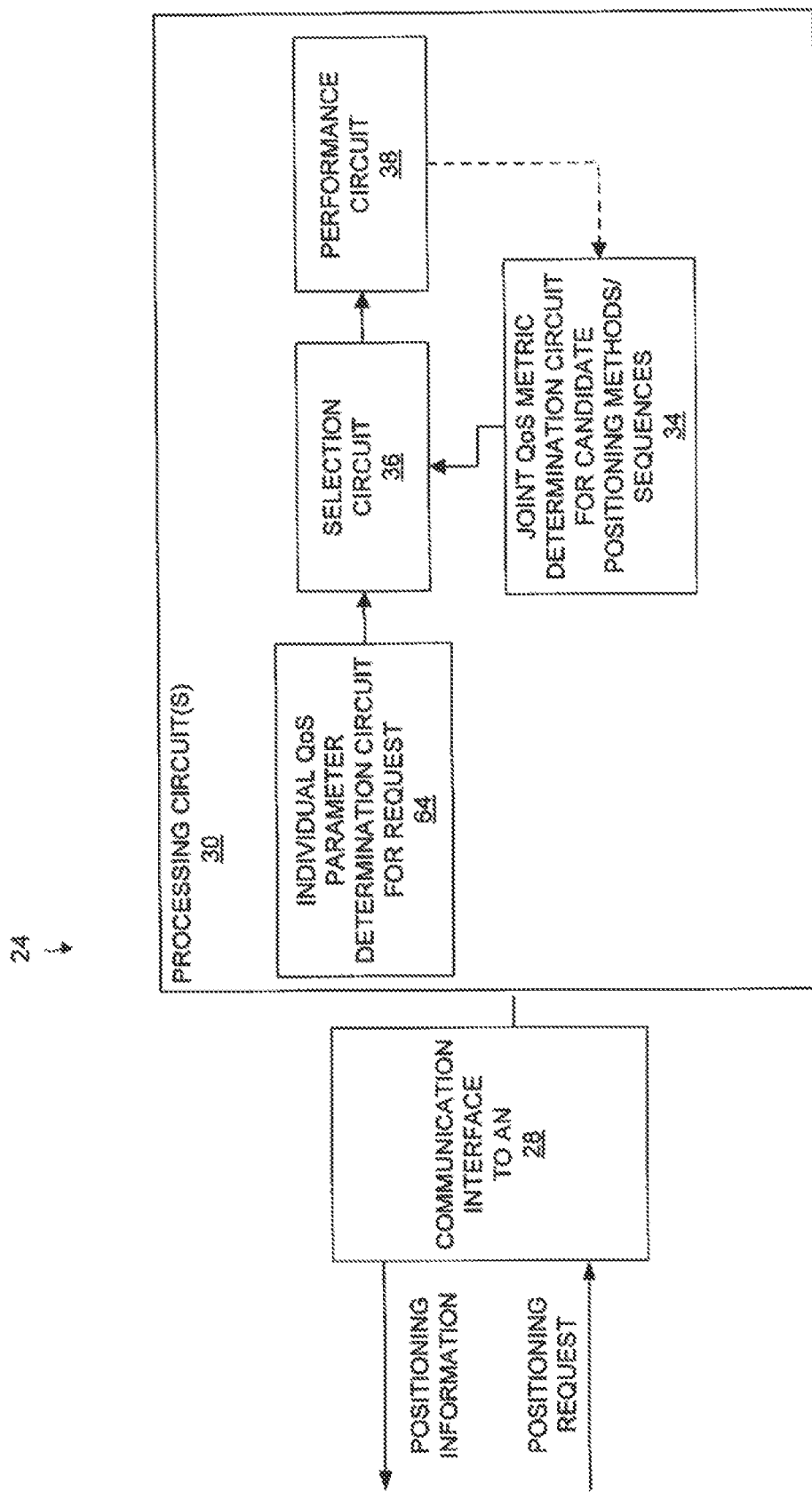
FIG. 9 is a block diagram of a positioning node configured to perform the method shown in FIG. 8.

FIG. 9 briefly illustrates an example of an apparatus configured to carry out the processing in FIG. 8. Specifically, FIG. 9 illustrates the apparatus as the PN 24, the PN 24 being similar to the PN 24 illustrated in FIG. 4, with a few exceptions. The PN 24 in FIG. 9 includes an individual QoS parameter determination circuit 64 configured to determine the individual QoS parameters associated with the request. The circuit 64 provides one or more of those parameters to the selection circuit 36, which performs the selection based on the parameters as discussed above. Note that the PN 24 in FIG. 9 does not include weighting values 40, as in FIG. 4, since no weighting is applied to different individual QoS parameters in these embodiments; that is, instead of weighting across individual QoS parameters, these embodiments just accumulate those parameters across positioning methods in a sequence.

Of course, those skilled in the art will readily appreciate that the above examples and figures are non-limiting, and thereby simply illustrate some embodiments of the present invention. For example, in one or more embodiments, the joint QoS metrics are associated with a set of characteristics of the mobile terminal 16. The set of characteristics comprises at least one or any combination of the following: the terminal type which is being positioned, its capabilities (e.g., a laptop may have a better receiver than a cellular telephone and a small radio node, e.g., a relay, may have a better receiver than a laptop), and its measurement configuration (e.g., measurement bandwidth). This information may be received in a positioning request, signalled in relation to the request, or extracted for the requesting entity from some other database (e.g., maintained in MME or eNodeB in LTE). The association can be accounted for in the positioning method or sequence selection logic to better adapt the positioning service to the characteristics of the mobile terminal being positioned.

Furthermore, although FIGS. 4 and 9 only illustrate the PN 24 as the apparatus performing the processing of FIGS. 2, 3, and/or 7, any one of various apparatuses may, as noted above, perform that processing. Furthermore, several embodiments have been described for convenience and ease of illustration using generalizations, but certain specific cases are also contemplated as being within the scope of the present invention and indeed may be equivalent.

For example, normalization of the individual QoS parameters has been generally described above with respect to pre-determined reference values $p^{ref}$. In one or more specific embodiments, though, these reference values $p^{ref}$ comprise the individual QoS parameters $p^r$ associated with the positioning request:

$$\hat{p}_{time}^m = \frac{p_{time}^r}{p_{time}^m} \qquad (10)$$

$$\hat{p}_{error}^m = \frac{p_{error}^r}{p_{error}^m}$$

That is, the obtained normalized values $\hat{p}^m$ describe the extent to which the individual QoS parameters $p^m$ satisfy the individual QoS parameters $p^r$ associated with the positioning request. So normalized, a joint QoS metric $J^m$ for a candidate positioning method inherently encompasses a comparison to the joint QoS metric $J^r$ for the request, such that selection may be simplified in some sense to selecting the candidate positioning method with the maximum joint QoS metric $J^m$:

$$m = \underset{m \in M}{\arg\max} \, J^m \qquad (11)$$

This same concept may be extended to candidate sequences of positioning methods.

Those skilled in the art will appreciate, however, that these specific embodiments are actually equivalent to the more general embodiments described above, where the joint QoS metrics for the request, and the candidate positioning methods or sequences, are normalized the same. Indeed, in these cases, the joint QoS metric $J^r$ for the request simplifies to unity:

$$J^r = \alpha \cdot \min\left(\frac{p^r_{time}}{p^r_{time}}, 1\right) + (1 - \alpha) \cdot \min\left(\frac{p^r_{error}}{p^r_{error}}, 1\right) = 1 \qquad (12)$$

Those skilled in the art will further appreciate that a mobile terminal 16 may comprise a mobile telephone, a Portable Digital Assistant, a laptop computer, or the like. Also, no particular communication interface standard is necessary for practicing the present invention. The mobile communication network 10, therefore, may be any one of a number of standardized network implementations, including Long Term Evolution (LTE), LTE-Advanced, or the any other implementation supporting, e.g., quantification of individual QoS parameters for a positioning request and/or candidate positioning methods or sequences.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by an electronic processing apparatus for responding to a request for a mobile terminal's geographic position, the method comprising:
   determining a joint quality of service, QoS, metric for each of a plurality of candidate sequences of positioning methods, a joint QoS metric jointly depending on two or more positioning methods in a candidate sequence, wherein determining a joint QoS metric for a candidate sequence comprises determining a joint QoS metric that is based on a weighted combination of two or more joint QoS metrics associated with that positioning sequence, the weighting applied depending on a service type of the request, each of the two or more joint QoS metrics comprising the accumulation of a different individual positioning QoS parameter across the positioning methods in the sequence; and
   selecting from said plurality a sequence of positioning methods, for determining the mobile terminal's position responsive to the request, based on said joint QoS metrics.

2. The method according to claim 1:
   further comprising determining a joint QoS metric for the request, the joint QoS metric jointly depending on two or more individual QoS parameters associated with the request; and
   wherein said selecting comprises selecting based on evaluating the joint QoS metric determined for the request in relation to the joint QoS metric determined for each of said plurality of candidate sequences of positioning methods.

3. The method according to claim 1:
   further comprising receiving one or more parameters indicative of one or more weighting values whose values depend on the service type of the request; and
   applying the one or more weighting values to weight the two or more QoS metrics.

4. The method according to claim 1, wherein determining a joint QoS metric for a candidate positioning sequence comprises determining the joint QoS metric as an accumulation of normalized values for an individual positioning QoS parameter across the positioning methods in the sequence.

5. The method according to claim 1, wherein each candidate sequence has a response time associated with its performance, and wherein said selecting comprises selecting the candidate sequence that has the maximum joint QoS metric or, if that includes multiple sequences having the same joint QoS metric, selecting from among those multiple sequences the one that has the minimum response time.

6. The method according to claim 1, wherein each candidate sequence has a cost associated with its performance, and wherein said selecting comprises selecting, from among those candidate sequences that have a joint QoS metric at least as great as a joint QoS metric determined for the request, the sequence that has the minimum cost.

7. The method according to claim 1, further comprising either:
   performing the selected sequence of positioning methods and returning the results of that selected sequence; or
   sending an indication of the selected sequence of positioning methods to another apparatus for that apparatus' performance thereof.

8. The method according to claim 7, further comprising dynamically updating the joint QoS metric for the performed positioning sequence based on the results of that sequence.

9. The method according to claim 1, wherein determining a joint QoS metric for a candidate sequence that jointly depends on two or more joint QoS metrics comprises preventing a first one of the two or more joint QoS metrics that has better quality from making up for a second one of the two or more joint QoS metrics that has lesser quality.

10. The method according to claim 1, wherein determining a joint QoS metric $J^{(m, n, \ldots)}$ for a candidate sequence of positioning methods (m, n, ...) that jointly depends on two or more joint QoS metrics $J_{p1}^{(m, n, \ldots)}$ and $J_{p2}^{(m, n, \ldots)}$ comprises calculating at least a portion of that joint QoS metric $J^{(m, n, \ldots)}$ as $\alpha_{p1} \cdot \min(J_{p1}^{(m, n, \ldots)}, 1) + \alpha_{p2} \cdot \min(J_{p2}^{(m, n, \ldots)}, 1)$, where $J_{p1}^{(m, n, \ldots)}$ is the accumulation of an individual QoS parameter p1 across the positioning methods (m, n, ...) in the sequence, $J_{p2}^{(m, n, \ldots)}$ is the accumulation of an individual QoS parameter p2 across the positioning methods (m, n, ...)

in the sequence, $\alpha_{p1}$ is a weighting value associated with p1, and $\alpha_{p2}$ is a weighting value associated with p2.

11. An electronic processing apparatus configured to respond to a request for a mobile terminal's geographic position, the apparatus comprising one or more processing circuits configured to:
  determine a joint quality of service, QoS, metric for each of a plurality of candidate sequences of positioning methods, a joint QoS metric jointly depending on two or more positioning methods in a candidate sequence, wherein determining a joint QoS metric for a candidate sequence comprises determining a joint QoS metric that is based on a weighted combination of two or more joint QoS metrics associated with that positioning sequence, the weighting applied depending on a service type of the request, each of the two or more joint QoS metrics comprising the accumulation of a different individual positioning QoS parameter across the positioning methods in the sequence; and
  select from said plurality a sequence of positioning methods, for determining the mobile terminal's position responsive to the request, based on said joint QoS metrics.

12. The electronic processing apparatus according to claim 11, wherein the one or more processing circuits are further configured to determine the joint QoS metric for the request, the joint QoS metric jointly depending on two or more individual QoS parameters associated with the request, and to select a sequence from said plurality based on evaluating the joint QoS metric determined for the request in relation to the joint QoS metric determined for each of said plurality of candidate sequences of positioning methods.

13. The electronic processing apparatus according to claim 11, wherein the one or more processing circuits are configured to:
  receive one or more parameters indicative of one or more weighting values whose values depend on the service type of the request; and
  apply the one or more weighting values to weight the two or more QoS metrics.

14. The electronic processing apparatus according to claim 11, wherein the one or more processing circuits are configured to determine a joint QoS metric for a candidate positioning sequence by determining the joint QoS metric as of normalized values for an individual positioning QoS parameter across the positioning methods in the sequence.

15. The electronic processing apparatus according to claim 11, wherein each candidate sequence has a cost associated with its performance, and wherein the one or more processing circuits are configured to select, from among those candidate sequences that have a joint QoS metric at least as great as the joint QoS metric determined for the request, the method or sequence that has the minimum cost.

16. The electronic processing apparatus according to claim 11, wherein the one or more processing circuits are further configured to:
  perform the selected sequence of positioning methods, and return the results of that selected sequence; or
  send an indication of the selected sequence of positioning methods to another apparatus for that apparatus' performance thereof.

17. The electronic processing apparatus according to claim 16, wherein the one or more processing circuits are further configured to dynamically update the joint QoS metric for the performed sequence based on the results of that performed sequence.

18. The electronic processing apparatus according to claim 11, wherein the one or more processing circuits are configured to:
  determine a joint QoS metric for a candidate sequence that jointly depends on two or more joint QoS metrics by preventing a first one of the two or more joint QoS metrics that has better quality from making up for a second one of the two or more joint QoS metrics that has lesser quality, each of the two or more joint QoS metrics comprising the accumulation of a different individual positioning QoS parameter across the positioning methods in the sequence.

19. The electronic processing apparatus according to claim 11, wherein the one or more processing circuits are configured to:
  determine a joint QoS metric $J^{(m, n, \ldots)}$ for a candidate sequence of positioning methods (m, n, . . . ) that jointly depends on two or more joint QoS metrics $J_{p1}^{(m, n, \ldots)}$ and $J_{p2}^{(m, n, \ldots)}$ by calculating at least a portion of that joint QoS metric $J^{(m, n, \ldots)}$ as $\alpha_{p1} \cdot \min(J_{p1}^{(m, n, \ldots)}, 1) + \alpha_{p2} \cdot \min(J_{p2}^{(m, n, \ldots)}, 1)$ where $J_{p1}^{(m, n, \ldots)}$ is the accumulation of an individual QoS parameter p1 across the positioning methods (m, n, . . . ) in the sequence, $J_{p2}^{(m, n, \ldots)}$ is the accumulation of an individual QoS parameter p2 across the positioning methods (m, n, . . . ) in the sequence, $\alpha_{p1}$ is a weighting value associated with p1, and $\alpha_{p2}$ is a weighting value associated with p2.

20. The electronic processing apparatus according to claim 11, wherein each candidate sequence has a response time associated with its performance, and wherein the one or more processing circuits are configured to select the candidate sequence that has the maximum joint QoS metric or, if that includes multiple sequences having the same joint QoS metric, selecting from among those multiple sequences the one that has the minimum response time.

* * * * *